(12) United States Patent
Baruzier et al.

(10) Patent No.: US 11,076,453 B2
(45) Date of Patent: Jul. 27, 2021

(54) HEATABLE GLAZING

(71) Applicant: AGC Glass Europe, Louvain-la-Neuve (BE)

(72) Inventors: Ophelie Baruzier, Valenciennes (FR); Renaud Hubert, Landenne (BE); Pierre Defoy, Louvain-la-Neuve (BE)

(73) Assignee: AGC Glass Europe, Louvain-la-Neuve (BE)

( * ) Notice: Subject to any disclaimer, the term of this patent is extended or adjusted under 35 U.S.C. 154(b) by 368 days.

(21) Appl. No.: 16/070,966

(22) PCT Filed: Dec. 19, 2016

(86) PCT No.: PCT/EP2016/081646
§ 371 (c)(1),
(2) Date: Jul. 18, 2018

(87) PCT Pub. No.: WO2017/118560
PCT Pub. Date: Jul. 13, 2017

(65) Prior Publication Data
US 2020/0170079 A1    May 28, 2020

(30) Foreign Application Priority Data

Jan. 8, 2016    (EP) .................................... 16150611

(51) Int. Cl.
*H05B 3/84*  (2006.01)
*B60S 1/02*  (2006.01)
*H05B 3/00*  (2006.01)

(52) U.S. Cl.
CPC ................ *H05B 3/84* (2013.01); *B60S 1/026* (2013.01); *H05B 3/0014* (2013.01); *H05B 2203/011* (2013.01); *H05B 2203/014* (2013.01); *H05B 2203/031* (2013.01); *H05B 2203/035* (2013.01)

(58) Field of Classification Search
CPC .. H05B 3/84; H05B 3/0014; H05B 2203/011; H05B 2203/014; H05B 2203/031; H05B 2203/035; H05B 2203/016; H05B 2203/017
USPC ....... 219/201, 203, 217, 219, 522, 528, 541, 219/543, 547, 548
See application file for complete search history.

(56) References Cited

U.S. PATENT DOCUMENTS

| 5,434,384 A | 7/1995 | Koontz |
| 5,543,601 A | 8/1996 | Bartrug et al. |
| 2012/0199569 A1* | 8/2012 | Dixon ..................... H05B 3/84 219/201 |

(Continued)

FOREIGN PATENT DOCUMENTS

EP      0 524 537 A2    1/1993

OTHER PUBLICATIONS

International Search Report dated Mar. 13, 2017 in PCT/EP2016/081646 filed Dec. 19, 2016.

*Primary Examiner* — Phuong T Nguyen
(74) *Attorney, Agent, or Firm* — Oblon, McClelland, Maier & Neustadt, L.L.P.

(57) ABSTRACT

A heatable glazing comprising a pane of glazing material with a first portion delimited by a first and a second bus bars wherein a voltage VI is applied and a second portion of the pane in need of rapid heating delimited by the second bus bar and a third bus bar wherein a voltage V2 is applied. The voltage VI is converted into a voltage V2 within the second portion by an electrical converter DC/DC.

14 Claims, 1 Drawing Sheet

(56) References Cited

U.S. PATENT DOCUMENTS

2012/0234816 A1* 9/2012 Petrenko .............. H05B 1/0236
  219/203
2016/0285307 A1* 9/2016 Wang ........................ H02J 7/34

* cited by examiner

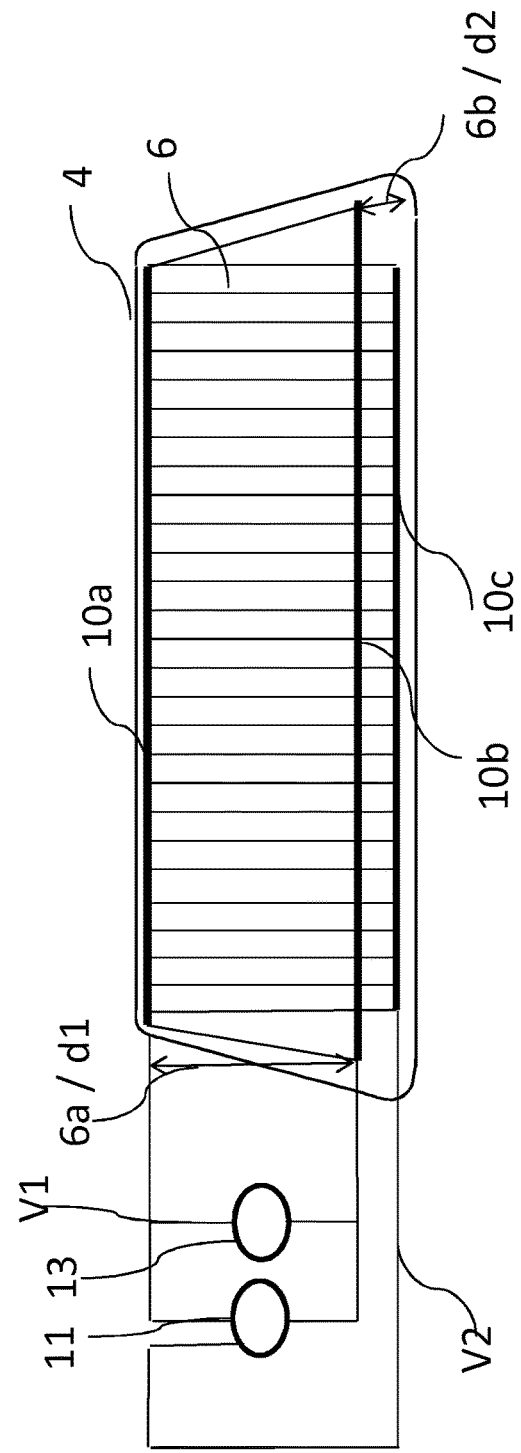

HEATABLE GLAZING

The present invention relates to heatable glazings and in particular to heatable glazings having a portion in need of rapid heating.

Glazings which are heated by the passage of electric current through a resistive heating element disposed on the window are often provided for the purpose of restoring or maintaining vision through the window where vision has been, or may be, reduced by condensation, frost, ice or snow. Terms such as "demisting", "defogging" or "deicing" are often used to describe the action of the heating element, and such windows have found particular application in vehicles, especially road vehicles, although their use is not limited thereto. Applications also exist in the doors of freezer display cabinets, and in windows for ships, trains and aircraft, for example.

Obviously, the area of the window heated by the heating element (the "heated area") needs to cover the area through which it is desired to restore or maintain vision (the "vision area"). This generally comprises a substantial part of the window, and in some applications it may comprise the whole of the transparent portion of the window (some windows having an opaque portion for aesthetic or other reasons). Resistive heating elements are also used to provide a heated area where a window wiper may rest when not in use, to prevent the wiper freezing to the window in cold conditions. Such an area is generally termed a heater wiper rest area (or a heated wiper parking area), and it may add to the area heated for reasons of maintaining vision; alternatively a heated wiper rest area may be provided on its own in which case the heated area is smaller.

The resistive heating element may comprise a thin transparent electrically conductive layer (such as a coating) on the window, or it may comprise an array of fine electrical conductors which extend across the window. The conductors may be fine wires, or alternatively lines printed in an electrically conductive ink. Electrical connection to the heating element is normally made by wider conductors known as busbars, which are adapted to carry substantial currents.

At its simplest, an electrically heated window may comprise a heating element and a pair of spaced opposed busbars, normally one on each of two opposed sides of a face of the window, with the heating element extending between them over the vision area. Electrical connection to an external power source, for example the power supply from the vehicle, may be made by plug and socket connectors of known type, the plug part of which is generally soldered or otherwise adhered to the busbar.

EP-A-0876 083 relates to a heated window where the heating element(s) and associated connections of electrically heated windows are configured so as to leave a selected area of the window free, e.g. for the provision of an additional item of equipment, while still providing a window that is acceptable both aesthetically and technically. This is achieved by using busbar portions of different widths in appropriate combinations.

More complicated circuits are known, comprising a number of resistive heating elements. For instance, U.S. Pat. No. 5,182,431 discloses an electrically heated window having at least three heating elements, at least one of which may be heated faster and to a higher temperature than the others. The various heating elements are connected in series by busbars. U.S. Pat. No. 4,513,196 discloses a heatable windshield which has one heatable zone which can be heated faster than another.

Unfortunately, the known methods of providing heatable glazings are complex, especially where a portion or zone of the glazing can be heated faster that the major or other portions of the glazing. This results in expense, may result in less efficient production of the glazings and leads to difficulties in ensuring that the heatable glazings are robust.

It is an aim of the present invention to address these problems and to provide a simple means of heating a glazing.

The present invention accordingly provides a heatable glazing comprising a pane of glazing material with a first portion delimited by a first and a second busbars wherein a voltage V1 is applied and a second portion of the pane in need of rapid heating delimited by the second busbar and a third busbar wherein a voltage V2 is applied.

According to the present invention, the voltage V1 is converted into a voltage V2 within the second portion of the heatable glazing by an electrical converter DC/DC. According to the present invention, the electrical converter DC/DC allows to convert a DC voltage with a particular value to another DC voltage. Preferably, the electrical converter DC/DC is used to convert a DC voltage with a particular value to another smaller value of DC voltage Preferably, the electrical converter DC/DC to convert a DC voltage with a particular value to another DC voltage is disposed in a second portion of the pane in need of rapid heating. The second portion may be, in general, any area of the pane. In vehicles (especially road vehicles such as cars) the second portion is, advantageously, the wiper rest area.

Thus, the present invention proposes a glazing with different heatable zones. The glazing comprises at least a pair of busbars and a further busbar. Preferably, busbars will be disposed on the pane, preferably on the same side of the pane.

Thus, commonly, a first and second portions of an heatable glazing are delimited by busbars. The first portion of the heatable glazing also called the "vision area" is delimited by a first and a second busbars generally elongating and extending across the pane and the second portion is delimited by the second busbar and a third busbar.

The first and the second busbars are separated by a distance d1 and the second and the third busbars are separated by a distance d2.

Generally, and especially if it is a wiper rest area, the second portion may be in the lower (i.e. when installed) portion of the pane.

Thus, thanks to the invention, the first and the second portions may be heated independently by using the power available from the vehicle. Thus, the second portion, preferentially the wiper rest area may be heated first and then the first portion may be heated. Inversely, the first portion may be heated before the second zone is heated. Alternatively, the first and second portions may be heated at the same time.

Preferably, the electrical converter DC/DC to convert a DC voltage with a particular value to another DC voltage, preferably with a smaller value is disposed onto (behind) the lower portion of the pane in the wiper rest area.

The electrical converter DC/DC to convert a DC voltage with a particular value to another DC voltage preferably with a smaller value with a high efficiency. By this way, the consumption of power coming from the source and the power dissipation inside the DC/DC converter are limited.

Preferably, the electrical converter DC/DC according to the invention to convert a DC voltage with a particular value to another DC voltage preferably with a smaller value is a buck converter which is a simple way to reduce the voltage of a DC supply.

According to the present invention, a voltage V1 is applied on the first portion of the glazing and a voltage V2 may be applied on the second portion from a voltage applied into the glazing panel. In order to provide an electrically efficient system that can heat two or more zones independently, simultaneously or separately the electrical converter is disposed into the second portion in order to use the power available from the vehicle and applied into the heatable glazing, to reach the required voltage into the second portion.

According to one embodiment, a voltage higher than 10V (volts) is applied to the glazing and according to the invention, the electrical converter DC/DC allows to convert this high voltage value V1 to a smaller voltage value V2. Thus, a voltage higher than 10V may be applied into the first portion and a smaller voltage may be applied into the second portion. In case of car's glazing, the higher value is dependent of the choice of voltage done by car's manufacturers.

One of the main advantages of the present invention is the first and second portion of the glazing may be controlled independently. Thus, the lower portion of the pane in the wiper rest area may be heated first and then faster than the larger first zone to lead to an efficient heating of the rest area when needed.

Preferably, the smaller voltage value V2 applied to the second portion is smaller than 5V.

According to one embodiment of the present invention, the predetermined voltage to be applied to the second portion may be calculated following the formula:

$$V2 = V1 \times (d2/d1) \times \alpha$$

wherein V2 is the voltage to be applied to the second portion of the heatable glazing, V1 is the voltage applied into the first portion of the heatable glazing by using the power available from the vehicle a vehicle, d1 the distance between the first and the second busbars delimiting the first portion, d2 the distance between the second and the third busbars delimiting the second portion, preferably the wiper rest area. α is an amplification factor that allows to inject more power to the second portion opposite to the first portion. The amplification factor is chosen to avoid any damage of the second portion. By this way the second portion may defrost faster than the first portion For example, if 50% more heat is required for the second portion relative to the heat applied in the first portion then the amplifying factor α is equal to 1.5

V1 and V2 may be determined by the power available from the power supply provided by the vehicle and the heating rate and temperature required. The busbar will generally have a resistance of less than 0.03 Ω/m, preferably less than 0.025 Ω/m and most preferably less than 0.0213 Ω/m. If made of copper strip, this would mean that the low resistance busbar would generally have a width of approximately 6 to 10 mm, preferably, 7 to 9 mm and most preferably about 8 mm (depth would be preferably between 50 and 200 microns, preferably 70 to 150 microns and length preferably between 50 and 100 cm and more preferably between 50 and 150 cm).

Preferably, the busbar comprises a metallic strip, preferably a copper strip.

In order to provide an electrically efficient system that can heat two or more zones, the electrical converter DC/DC and the busbars may be electrically connectable to a resistive heating element for heating the glazing. Independent connectability is advantageous because it allows the heating of the portion of the glazing in which the converter is disposed (when the high resistance busbar is connected). When the busbars are connected it allows heating of the other portion of the pane over which the resistive heating element extends.

Preferably, where the glazing comprises a resistive heating element, this comprises an array of fine electrical conductors extending across the pane. The conductors may be lines printed in a conductive ink (such as a silver-containing frit) which is fired onto the glass surface, or they may be thin wires, e.g. of tungsten. Generally, printed lines in conductive ink are preferred for a glazing comprising a pane wholly of tempered glass.

Thin wires and particularly tungsten wires are usually more preferred where the pane comprises a laminate, since the wires may be positioned between two of the plies making up the laminate, and thereby fixed in position.

Furthermore, thanks to the present invention and the use of a converter particularly in the case of heatable glazing with thin wires (preferably tungsten wires), the wires do not need to be cut into two parts: vision area and the wiper rest area. Indeed, the second busbar is directly applied by contact to the existing resistive heating element to delimited the second portion.

Thus, in term of manufacturing process, only one busbar (second busbar) should be added to the existing product to offer a new product with a first and a second portions which could be heated independently. The second portion may be heated more rapidly than the first portion. Furthermore, the first and the second portions may be activated independently and therefore at different frequencies and durations and this according to the actual needs in defrosting.

The conductors may extend over the pane from side to side or they may extend from top to bottom, whichever suits the shape of the pane better.

The thickness of the conductors may be varied to alter their resistance. For instance, if printed, the conductors may be printed in different widths, typically in the range from 0.4 mm to 1.0 mm. Where the conductors are wires, different thicknesses of wire may be used, typically in the range of 15 to 50 microns. However, the thickness may be higher as when copper wires are used (100 to 300 microns). Conductor resistance may be varied to preferentially heat certain areas of the window, or to balance the combined resistance of different groups of unequal numbers of conductors to produce a more uniform heating effect.

The resistive heating element will usually have at least one additional busbar at the side of the element distant from the electrical converter and busbars.

The, or each, busbar may be printed in conductive ink, which is preferred if the conductors are formed in the same way. Alternatively, when the conductors are fine metal wires, the busbars may be printed in conductive ink or formed from metal strip, e.g. tinned copper strip.

Busbars (especially printed busbars) may be tapered or stepped, especially towards their ends. Consequently, references in this specification to busbar width are, unless the context indicates otherwise, references to the width of a part of a busbar (or busbar portion) which is of constant width. Local variations in width, especially a local widening, should be ignored. In the absence of any substantial busbar part of constant width, the reference should be taken to be to the average width of a part of a busbar (or busbar portion). Obviously, the widths of relatively wide and relatively narrow busbar portions are to be considered separately.

Busbars made from metal strip, e.g. tinned copper strip, need not be as wide as those produced from conductive ink because metal strip materials have an inherently greater conductivity.

The pane may be any sheet glazing material, e.g. glass or plastics or a composite of either or both materials. The pane may further be flat or curved, and/or body-tinted or coated; it may also be a laminate of a number of plies of glass and plastics. The pane may in particular be of tempered glass.

The heatable glazings of the present invention have uses in all areas where glazings are needed; they have found particular application in vehicles, especially road vehicles, although their use is not limited thereto. Applications also exist in the doors of freezer display cabinets, and in windows for ships, trains and aircraft, for example.

In all embodiments of the invention, the glazing is associated with a power supply providing a supply voltage. The busbars have a resistance value such that the busbars are suitable for heating the glazing on application of that voltage, more particularly for heating the glazing to a degree that provides for demisting or de-icing of the glazing.

Embodiments of the present invention will now be described with reference to the accompanying drawing FIG. 1 which illustrates schematically a configuration of a heatable glazing according to the invention.

One configuration of a heatable glazing is shown in FIG. 1. The glazing is a laminated windshield 4 for a vehicle, for example a car. One heating element 6 extend across the windshield 4. The resistive heating element 6 comprises metallic wires, preferably thin wires of tungsten, situated in the interior of the laminated windshield (next to the plastics interlayer) which heat the windshield 4 when current passes through them. Alternatively, the metallic wires may be conductive strips printed on the windshield (typically on face 4 of the laminate, i.e. the surface facing the interior of the vehicle) using a conductive ink (e.g. silver particles in a glass frit).

At the top of the windshield 4, there is first top busbar 10a, which connects the resistive heating element of the "vision area" 6a to a second busbar 10b.

The second busbar 10b connected to the resistive heating element 6 is situated towards the bottom of the windshield 4 in the wiper rest areas 14. The busbar 10b is connected to the ground (not shown) of the vehicle.

Also towards the bottom of the windshield, and below the busbars 10b, is a third busbar 10c also connected to the resistive heating element 6 of the wiper rest area 6b. The busbar 10a may be connected to the electricity (power) supply of the vehicle 13. Each busbar has two possible connecting element on each extremity of the busbars (not shown).

Thus, the heating element 6 extending across the windshield 4 is separated in first portion 6a delimited by the first 10a and the second busbars 10b, also called the "vision area" and a second portion 6b, the wiper rest area, delimited by the second 10b and the third 10c busbars.

In order to heat the wiper rest area 6b, the busbar 10c is electrically connected to the electrical converter DC/DC using contact element (not shown), for example thanks to an electrical connector.

The electrical converter DC/DC 11 is electrically connected to the car 13. Then the output voltage from the converter is applied to the busbar 10c. Thus, thanks to the use of the electrical converter, only one voltage is needed from the vehicle to powered the windshield 4. Furthermore, the converter is chosen to convert efficiently the voltage by minimizing the power dissipation.

Furthermore, thanks to the present invention and the use of a converter particularly in the case of heatable glazing with thin wires (preferably tungsten wires), the wires do not need to be cut into two parts: vision area and the wiper rest area. Indeed, the busbar 10b is directly applied by contact to the existing heating element 6 to delimited the wiper rest area (second portion).

Preferably, the electrical converter DC/DC 11 to convert a DC voltage with a particular value to another DC voltage is disposed in a second portion of the pane in need of rapid or independent heating. Preferably, the electrical converter DC/DC 11 is placed on face 4 of the laminate, i.e. the surface facing the interior of the vehicle. Thus the electrical converter allows to convert a voltage of more or less 14V provided by a power source 13 to a smaller voltage of for example more or less 3V.

The invention claimed is:

1. A heatable glazing comprising a pane of glazing material with a first portion delimited by a first busbar and a second busbar wherein a voltage V1 is applied and a second portion of the pane in need of rapid heating delimited by the second busbar and a third busbar wherein a voltage V2 is applied,
   wherein the voltage V1 is converted into the voltage V2 within the second portion by an electrical converter DC/DC,
   wherein the first portion and second portion of the pane are separate portions of the glazing, and
   wherein the first portion and the second portion are independently heatable.

2. The heatable glazing according to claim 1, wherein the heatable glazing is a laminated glazing.

3. The heatable glazing according to claim 2, wherein the electrical converter DC/DC is placed on a face of the laminated glazing configured to face an interior of a vehicle.

4. The heatable glazing according to claim 1, wherein the voltage V2 is smaller than the voltage V1.

5. The heatable glazing according to claim 1, wherein the voltage V2 is calculated from the following formula:
   $V2=V1\times(d2/d1)\times a$, wherein V2 is the voltage to be applied into the second portion, V1 is the voltage applied into the first portion, d1 is a distance between the first and the second busbars delimiting the first portion, d2 is a distance between the second and the third busbars delimiting the second portion, and a is an amplifying factor to apply more power into the second portion.

6. The heatable glazing according to claim 1, wherein second portion of the pane is a wiper rest area.

7. The heatable glazing according to claim 1, wherein the glazing is a windshield.

8. The heatable glazing according to claim 1, further comprising at least one further busbar.

9. The heatable glazing according to claim 1, wherein the busbars and the electrical converter DC/DC are electrically connectable to a resistive heating element for heating the glazing.

10. The heatable glazing according to claim 9, wherein the resistive heating element comprises an array of fine electrical wires extending across the pane.

11. The heatable glazing according to claim 9, wherein the resistive heating element comprises an array of thin wires of tungsten extending across the pane.

12. The heatable glazing according to claim 1, wherein the electrical converter DC/DC and busbars are electrically connectable to a resistive heating element for heating the glazing.

13. The heatable glazing according to claim 1, wherein the pane comprises a laminate having at least two glass plies and at least one plastics ply.

14. The heatable glazing according to claim 1, wherein the pane comprises tempered glass.

\* \* \* \* \*